United States Patent [19]

Jurjevic et al.

[11] Patent Number: 4,609,014

[45] Date of Patent: Sep. 2, 1986

[54] VARIABLE RATE FLOW CONTROLLER

[75] Inventors: Richard A. Jurjevic, Springfield; William J. Schmidt, New Lebanon, both of Ohio

[73] Assignee: Vernay Laboratories, Inc., Yellow Springs, Ohio

[21] Appl. No.: 791,628

[22] Filed: Oct. 25, 1985

[51] Int. Cl.[4] ............................................. G05D 7/01
[52] U.S. Cl. ..................................... 138/45; 137/504; 137/517
[58] Field of Search ................... 138/45; 137/504, 517

[56] References Cited

U.S. PATENT DOCUMENTS

| | | | |
|---|---|---|---|
| 1,657,663 | 1/1928 | Devereux | 138/45 |
| 3,072,151 | 1/1963 | Quercia | 138/45 |
| 3,095,175 | 6/1963 | Iketani | 138/45 X |
| 3,444,897 | 5/1969 | Erickson | 138/45 |
| 3,833,019 | 9/1974 | Diggs | 138/45 |

*Primary Examiner*—Robert G. Nilson
*Attorney, Agent, or Firm*—Biebel, French & Nauman

[57] ABSTRACT

The rate at which a flow control valve maintains flow under varying pressures can be adjusted by positioning a resilient flow control washer on a valve seat and engaging the opposite surface of the washer with an adjustable member which can be moved toward and away from the valve seat to compress the washer in varying amounts and thereby alter the value at which the washer maintains a constant flow.

9 Claims, 9 Drawing Figures

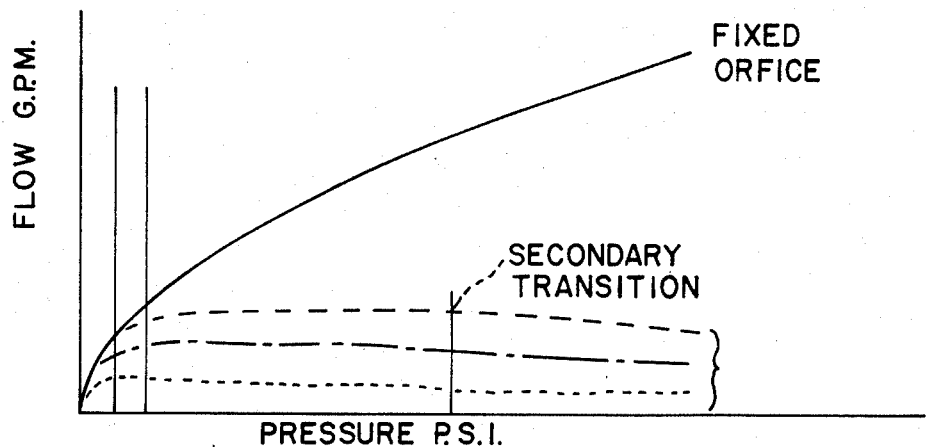
FIG-7
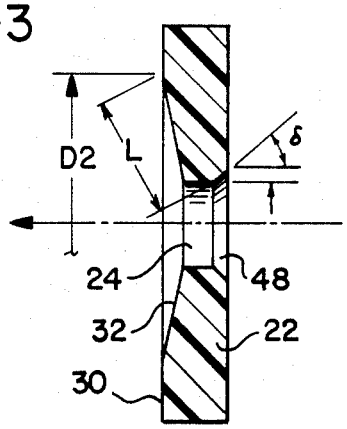
FIG-3
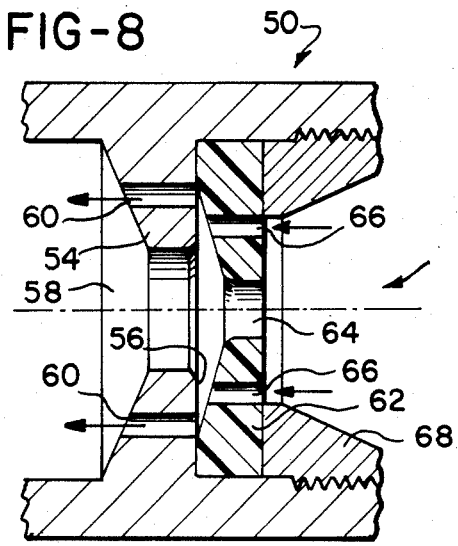
FIG-8
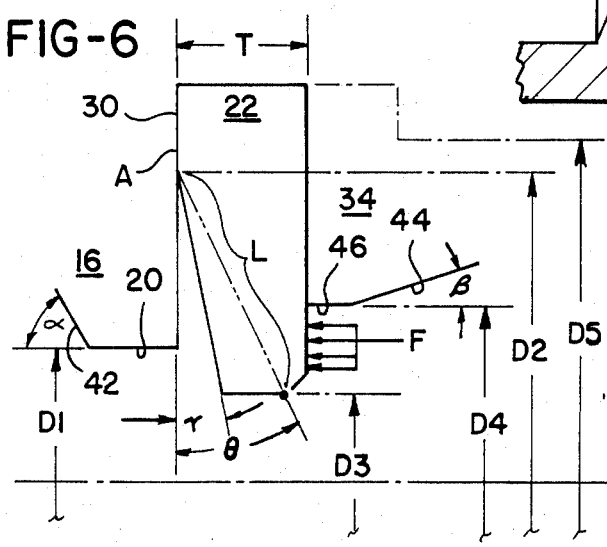
FIG-6
FIG-9

VARIABLE RATE FLOW CONTROLLER

BACKGROUND OF THE INVENTION

Devices for controlling the rate of flow of a fluid, primarily liquids, at varying line pressures, are utilized in a variety of applications, such as clothes washers and dishwashers, showers, faucets and plumbing valves, drinking fountains, ice makers, water softeners, automotive heating systems, fuel systems, water cooled equipment and heat exchangers, gas valves, pneumatic machine tools, respiratory controls, and drip irrigation and water sprinklers.

Perhaps the most effective control for this wide variety of installations is a rubber flow control washer, which can be routinely engineered to maintain a constant flow rate despite variations in line pressure. For example, various rubber flow control washers are available for maintaining an essentially constant flow in a range of from less than 1 gpm to flows in excess of 100 gpm under pressure variations ranging from 15 psi to 150 psi.

Regardless of the specific application, generally a flow control washer is designed by specifying a rubber or rubber-like material having a requisite modulus of elasticity, thickness, diameter, contour and flow aperture to give the desired quantity of flow over a range of pressures likely to be encountered in the specific application for which the flow control has been designed.

While conventional flow control washers have proven efficient for a wide variety of applications, as noted above, each washer, as also indicated above, is designed for a specific rate of flow desired, but if it is necessary to operate at a different flow rate, the flow control washer must be exchanged for another washer designed to operate at that different flow rate.

It should also be noted that there is a class of valves which incorporate an apertured rubber or rubber-like member received between two relatively rigid members that can be advanced toward and retracted away from each other to squeeze and release the rubber part to change the diameter of the opening through it. For example, U.S. Pat. Nos. 1,657,663; 3,072,151; 3,095,175; and 3,833,019 each show constructions of this general type in which an attempt is made to control flow by changing the diameter of the orifice through a resilient valve element.

It should be noted, however, that devices of this type merely adjust the flow rate for a given line pressure, but fail to provide for pressure variations that may occur, so that if pressure increases with a device of this type, the flow rate will also increase, and conversely, should the line pressure decrease the flow rate will decrease.

In the particular applications shown in the above-noted patents, flow control under varying line pressure may not be of sufficient importance to warrant a control responsive to pressure variations. For example, U.S. Pat. No. 1,657,663 discloses a device adapted to control the flow of a lime emulsion or solution used for flotation in minerals separating apparatus, U.S. Pat. Nos. 3,072,151 and 3,095,175 are directed to devices for use in butane or propane lighters, and U.S. Pat. No. 3,833,019 covers a quick-connect fitting for a trickle type irrigation system.

In many instances, however, it is desirable to not only provide fluid flow control, that is, to provide a substantially constant flow rate despite variations in line pressure, but also to be able to fix the value of that flow rate at different amounts to satisfy changed conditions. While all of the prior art discussed above either provides flow control in response to pressure variations, or a variable flow rate without regard to changes in line pressure, none of the prior art would appear to provide both flow control in response to changes in line pressure and a capability of changing the nominal value at which the flow rate is maintained.

SUMMARY OF THE INVENTION

In accordance with the present invention, flow control is provided which is responsive to pressure variations, but which also permits the value at which the flow is controlled to be varied as desired.

Thus, in accordance with the present invention a resilient flow washer is positioned on a valve seat formed in a flow passage through a flow control valve and an adjustment device is positioned within the flow passage upstream of the flow control washer to engage the upstream face of the washer, and by advancing and retracting the adjusting member with respect to the valve seat, with the washer engaged by both, the rate at which the flow control washer maintains flow through the valve can be varied over a range of values.

Preferably the flow control washer is made of a rubber or rubber-like material compounded for the particular environment in which it is to function and flow apertures are formed through the valve seat, flow control washer and adjusting member which are concentric with respect to each other and with the aperture through the adjusting member being larger in diameter than the apertures through the flow washer and the valve seat, and the aperture through the valve seat larger than the aperture through the flow washer.

In a preferred embodiment of the invention the flow passage upstream of the valve seat can be internally threaded and the adjusting member externally threaded with threads complementary to and in engagement with the threads in the flow passage, permitting the adjusting member to be rotated and consequently moved toward and away from the valve seat with the flow washer between the two and thus cause the rate at which the flow washer maintains flow to be changed accordingly.

While a substantial portion of the surface of the flow washer must be exposed to flow in order for it to function effectively, and hence the diameters of the openings through the valve seat and the adjusting member must be substantially larger than the diameter of the opening through the washer, the washer must also be firmly supported in order to obtain a predictable control, and in this regard the valve seat should be substantially planar and lying in a plane substantially normal to the longitudinally extending flow control passage, and the compression face of the adjusting member which engages the upstream face of the flow control washer should be correspondingly flat and also perpendicular or normal to the passage.

While both faces of the flow control washer can be substantially flat, in the embodiment disclosed herein the downstream face of the flow control washer has an outer peripheral portion that is flat, while an inner annular portion surrounding the opening through the washer is sloped inwardly in an upstream direction from the outer peripheral portion to the flow opening to provide, as will become apparent, an additional degree of flow control.

It will also be noted that the thickness of the flow control washer should be no greater than one-half its outside diameter and at least twice the diameter of its flow opening, while the diameter of the flow opening in the flange which forms the valve seat is less than three times the diameter of the flow opening in the flow control washer.

In another embodiment of the invention one or more secondary openings can be formed through the valve seat and the flow control washer outwardly of the main flow openings through each of these components. With this configuration additional flow is provided at low pressures, but as pressure increases, the downstream face of the flow control washer at the above-noted inner annular portion moves into contact with the valve seat, closing the secondary openings through these members and causing all flow to thereafter pass through the primary orifices and the valve to thus function in the manner of the previously described embodiment.

These and other features and advantages of the invention will become more apparent from the following detailed description.

BRIEF DESCRIPTION OF THE DRAWINGS

FIG. 3 is a cross sectional view through a flow control washer used in one embodiment of the present invention;

FIG. 6 is a diagrammatic view setting forth the relationships between the various dimensions and configurations of the components of the flow control valve;

FIG. 7 graphically compares flow through a flow control valve in accordance with the present invention and a fixed orifice valve;

FIG. 8 is a cross sectional view through a second preferred embodiment of the present invention; and FIG. 9 is a view similar to FIG. 8, but showing the valve in a higher pressure configuration.

DESCRIPTION OF THE PREFERRED EMBODIMENTS

Figure 1:
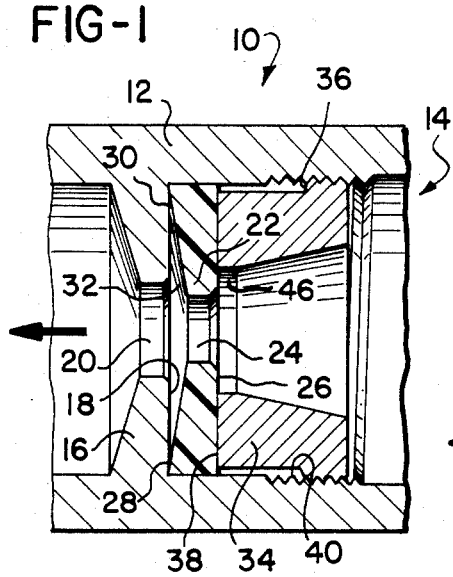
FIG. 1 is a cross sectional view through a flow control valve in accordance with the present invention.

As seen in FIG. 1 of the drawings, a variable rate flow control valve 10 in accordance with the present invention includes a valve body 12 defining a longitudinally extending flow control passage 14 having a radially inwardly projecting flange 16 defining a substantially planar valve seat 18 and a flow opening 20 through said flange. It will be seen from FIG. 1 that the valve seat 18 is substantially planar and lies in a plane substantially normal to the longitudinally extending flow passage 14.

A resilient flow control washer 22 having a flow opening 24 therethrough and capable of maintaining a substantially constant flow rate by deformation in response to varying pressures imposed on its upstream surface 26 is positioned in the flow passage with its downstream face 28 seated on the valve seat 18.

As seen in FIG. 1, the downstream face of the flow control washer 22 includes an outer peripheral portion 30 which seats firmly on the valve seat 18, and an inner annular portion 32 which slopes inwardly in an upstream direction from the essentially flat outer peripheral portion 30 to the flow opening 24.

An adjusting member 34 having external threads 36 and a compression face 38 engaging the upstream face 26 of the flow washer is positioned in the flow passage upstream of the valve seat 18 with its threads 36 in engagement with complementary internal threads 40 formed in the flow passage defined by the valve body 12.

With reference to FIGS. 3 and 6 of the drawings, the configurations of the components of the valve and their relationships to each other are somewhat diagrammatically depicted. Thus, it will be seen that the flange 16 has a sloped downstream surface 42 disposed at an angle $\alpha$ with respect to the surface of the opening 20 through the valve seat, and the inner annular portion 32 of the flow washer 22 is sloped at an angle $\gamma$ with respect to its outer peripheral portion 30. Adjusting member 34 has a surface 44 sloping outwardly in an upstream direction at an angle $\beta$ with respect to the surface of a flow opening 46 formed in the adjusting member. Length L is a theoretical dimension measured from the point of intersection A of portions 30 and 32 of the flow washer and the intersection of the surface of the opening 24 of the flow washer and its Chamfered portion 48 which extends at an angle $\delta$ with respect thereto, while length L in the undistorted state of the flow washer forms an angle $\theta$ with respect to the valve seat 18.

F indicates the force resulting from the pressure differential of the flowing media against the upstream face of the flow washer versus the lower downstream pressure, while dimension D1 is the diameter of the opening through the flange defining the valve seat, D2 is the diameter of that portion of the flow washer measured at the point of intersection A, D3 is the diameter of the opening through the flow control washer, D4 is the diameter of the flow opening through the adjusting member 34 and D5 is both the inside diameter of the flow passage 14 and the outside diameter of the flow washer 22.

Figure 2:
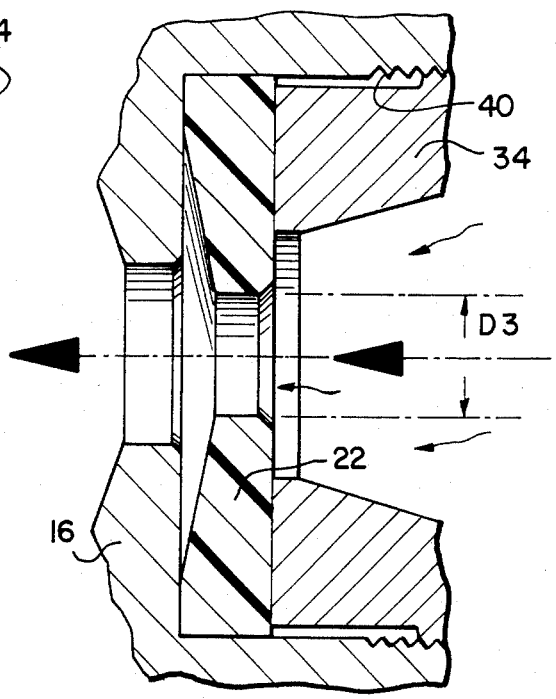
FIG. 2 is an enlarged cross sectional view of a portion of the valve of FIG. 1.

With these relationships in mind and with further reference to FIGS. 2, 4, 5 and 7, the operation of the valve will be described. In FIG. 2 the flow washer 22 is clamped against the valve seat 16 by the adjusting member 34 with little or no distortion of the flow washer. In this configuration D3 is at its nominal size, and at low pressures it will allow the fluid to flow at rates in direct proportion to the square root of the differential pressure divided by the specific gravity of the flowing media. FIG. 7 shows a representative curve generated from Bernoulli's equation for flow through a fixed (inflexible) orifice. When the area of the orifice and the discharge coefficient remain constant, the values for flow at a given pressure will vary with the specific dimensions selected, and flow rates will vary in direct proportion to the "upstream" pressure.

On the other hand, with a pressure compensating flow control there will be an initial increase in the flow rate as pressure increases until the transition zone is reached, at which time flow will remain relatively constant with continued pressure increase. This compensation occurs in the following manner: the force F exerted by the flowing media against the exposed front surface of the flow washer causes a predictable deflection of the washer which reduces the angle $\gamma$ and thoretical angle $\theta$. Since the material properties are known, length L is used as the value in calculating the deflected angle using standard Belleville spring equations for predicting the flexure of a circular beam fixed at one edge. As angle γ (or θ) decreases, the functional area of the orifice D3 is reduced. The ratio of D4 to D3 is increased, thus reducing the discharge coefficient. Applying Bernoulli's equation with these revised values, it can readily be seen that the flow rate calculation follows the variable orifice curve in FIG. 7 until angle γ has passed through the plane formed by the seat in the housing and has essentially become a negative angle with respect to its original position and the plane of the seat. This will occur at a predictable pressure once angle γ has reached the plane of the seat. Angle γ continues to decrease until D3 reaches a minimum value. As pressure increases beyond this point, the diameter D3 of the orifice increases as θ passes through 0° relative to the seat, creating the secondary transition shown on FIG. 7.

Figure 4:
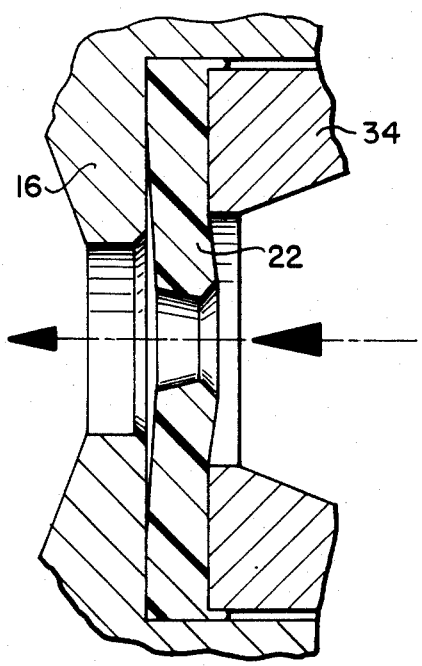
FIGS. 4 and 5 are views similar to FIG. 2, but showing the interaction between the components of the flow control valve as the adjusting member is advanced toward the valve seat.

If a different, but still constant flow rate is desired, the adjusting member 34 may be advanced, as seen in FIG. 4, towards the valve seat 18, causing a partial extrusion of the flow washer 22. As the adjusting member 34 is advanced, angle γ is reduced, thus constricting the diameter D3 of the flow opening through the washer. Using these adjusted values, the application of Bernoulli's equation will yield lower values for the flow and shift the curve of FIG. 7 from the position shown by the dashed line to the position shown, for example, by the dash-dot or dotted lines.

Figure 5:
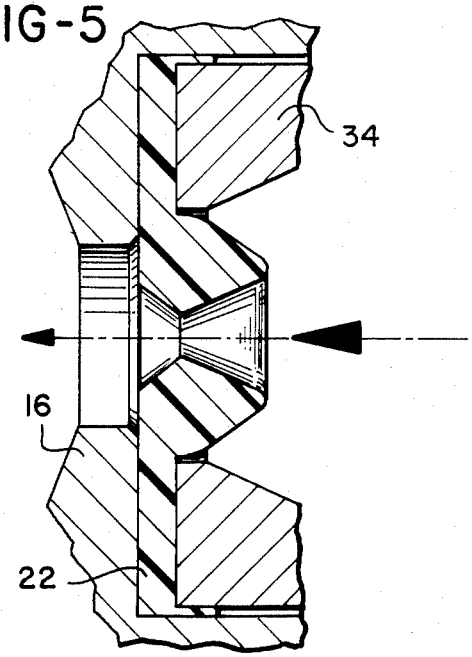

Further advancement of the adjusting member 34 towards the valve seat 16 is depicted in FIG. 5 of the drawings, and will be seen that with the flow washer compressed to less than its original thickness significant extrusion of the washer into the cavity defined by the diameter D4 occurs. This creates a phenomena similar to the so-called "Borda" effect on the flow orifice, such that adjustability of the flow rate becomes disproportionate to previous adjustment ratios. The net result of this shift to a Borda-like effect acts to maintain linearity of the adjustment and pressure compensation.

Thus, with the emdodiment shown in FIGS. 1–5 of the drawings, a variable rate flow control valve is provided which not only effects a substantially constant flow rate despite variations in line pressure, but also permits the value at which the flow rate is fixed to be varied to the rate desired.

In FIGS. 8 and 9 a second preferred embodiment 50 is shown which finds application in situations where increased flow at lower pressures is desired. Variable rate flow control valve 50 defines a longitudinally extending flow control passage 52 and has an inwardly extending flange 54 providing a planar valve seat 56. In addition to a flow opening 58 formed through the flange 54 secondary openings 60 are also provided.

A flow control washer 62 is seated on seat 56 and has a flow control opening 64 concentric with and of smaller diameter than the flow opening 58. Flow washer 62 is also provided with secondary flow opening 66 which are nonaligned with openings 60 in the flange 54.

Additionally, a threaded adjusting member 68, similar to the adjusting member 34 is received within the flow passage and engages complementary threads formed in the flow passage so that the adjusting member 68 may be moved towards and away from the valve seat 56 to vary the value of the rate at which fluid flow is controlled, in the manner described above.

As will be seen from a comparison of FIGS. 8 and 9, at low line pressures, in addition to flow through the openings 64 and 58, there will be secondary flow through the openings 66 and 60. However, as pressure increases the flow washer will assume the configuration shown in FIG. 9, effectively sealing the openings 66 and 60, and thereafter all flow will be through the openings 64 and 58 and the flow control valve will function in the same manner described above for the embodiment of FIGS. 1 through 5.

It will be seen, therefore, that the present invention provides effective flow control and permits a shift in the value of the flow rate at which flow is being maintained.

While the forms of apparatus herein described constitute preferred embodiments of this invention, it is to be understood that the invention is not limited to these precise forms of apparatus, and that changes may be made therein without departing from the scope of the invention which is defined in the appended claims.

What is claimed is:

1. In a variable rate flow control valve including a resilient flow control washer having a flow opening therethrough and capable of maintaining a substantially constant flow rate therethrough by deformation in response to varying pressure imposed on said washer, the improvement comprising:

means defining a longitudinally extending flow control passage through said valve, a radially inwardly projecting flange defining a substantially planar valve seat in said passage, means defining a flow opening through said flange, said valve seat lying in a plane substantially normal to said longitudinally extending flow control passage, said flow control washer having a downstream face thereof seated on said valve seat, said flow opening through said flow control washer being substantially concentric with and of a smaller diameter than said flow opening through said seat, adjusting means received within said passage upstream of said flow control washer, said adjusting means having a compression face disposed substantially normally to said longitudinally extending flow control passage and in opposition to said valve seat, means defining through said adjusting means a flow opening concentric with and of greater diameter than said flow openings through said valve seat and said flow control washer, said compression face being adapted to engage an upstream face of said flow control washer, and means for selectively positioning said adjusting means with respect to said flange with said compression face and valve seat in engagement with said upsteam and downstream faces, respectively, of said flow control washer to vary the constant rate of flow maintained by said flow control washer.

2. The valve of claim 1 wherein said flow control washer has a thickness no greater than one half the outside diameter of said flow control washer.

3. The valve of claim 1 wherein said flow control washer has a thickness at least twice the diameter of said flow opening of the flow control washer.

4. The valve of claim 1 wherein the diameter of said flow opening in said flange is less than three times the diameter of said flow opening in said flow control washers.

5. The valve of claim 1 wherein said flow control washer has an outer peripheral portion and an inner annular portion surrounding said flow opening therethrough, and said outer portion is of greater thickness than said inner portion.

6. The valve of claim 5 wherein said valve seat contacts said flow washer only at said outer peripheral portion thereof.

7. The valve of claim 1 wherein said means for selectively positioning said adjusting means comprises means defining external threads on said adjusting means, and complementary threads formed in said flow passage in engagement with said adjusting means threads.

8. The valve of claim 1 further comprising secondary openings in said flange and washer in nonaligned relationship to each other.

9. In a variable rate flow control valve including means defining a longitudinally extending flow control passage through said valve and a resilient flow control washer positioned in said passage, having a flow opening therethrough and capable of maintaining a substantially constant flow through said passage by deformation of said washer in response to varying pressure imposed on an upstream face thereof, the improvement comprising:

a radially inwardly projecting flange positioned in said passage and defining a valve seat lying in a plane substantially normal to said longitudinally extending flow control passage and having a flow opening therethrough of greater diameter than said flow opening in said washer, said flow control washer having an outer peripheral portion of greater thickness than an inner annular portion surrounding said flow opening therethrough with said outer portion seated on said valve seat, means defining internal threads in said flow control passage upstream of said valve seat, externally threaded adjusting means positioned within said flow control passage with said internal threads complementary to and in engagement with the external threads on said adjusting means for movement of said adjusting means relative to said valve seat, means defining through said adjusting means a flow opening concentric with and of greater diameter than said flow openings in said washer and valve seat, and said adjusting means having a compression face in engagement with an upstream face of said flow washer, whereby said washer may be compressed between said adjusting means and said seat to thereby vary the value at which flow is maintained through said valve.

* * * * *